(12) United States Patent
Kubota et al.

(10) Patent No.: US 10,395,855 B2
(45) Date of Patent: Aug. 27, 2019

(54) SWITCH

(71) Applicant: MITSUBISHI ELECTRIC CORPORATION, Chiyoda-ku, Tokyo (JP)

(72) Inventors: Masato Kubota, Tokyo (JP); Tomotaka Yano, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/086,632

(22) PCT Filed: Apr. 28, 2016

(86) PCT No.: PCT/JP2016/063485
§ 371 (c)(1),
(2) Date: Sep. 20, 2018

(87) PCT Pub. No.: WO2017/187635
PCT Pub. Date: Nov. 2, 2017

(65) Prior Publication Data
US 2019/0108950 A1    Apr. 11, 2019

(51) Int. Cl.
*H01H 1/38* (2006.01)
*H01H 3/38* (2006.01)
(Continued)

(52) U.S. Cl.
CPC .............. *H01H 3/46* (2013.01); *H01H 1/385* (2013.01); *H01H 3/38* (2013.01); *H01H 9/02* (2013.01);
(Continued)

(58) Field of Classification Search
CPC ............ H01H 3/46; H01H 3/38; H01H 1/385; H01H 9/02; H01H 9/38; H01H 31/003; H01H 33/12; H01H 33/901; H01H 33/903
(Continued)

(56) References Cited

U.S. PATENT DOCUMENTS 3,555,225 A * 1/1971 Saffold ............... H01H 33/903
218/60
7,919,720 B2 * 4/2011 Shimizu ............... H01H 33/90
218/55
(Continued)

FOREIGN PATENT DOCUMENTS

JP    7161267 A    6/1995
JP    11120876 A    4/1999
(Continued)

OTHER PUBLICATIONS

International Search Report (PCT/ISA/210) dated Aug. 2, 2016, by the Japan Patent Office as the International Searching Authority for International Application No. PCT/JP2016/063485.

*Primary Examiner* — Edwin A. Leon
*Assistant Examiner* — William A Bolton
(74) *Attorney, Agent, or Firm* — Buchanan Ingersoll & Rooney PC

(57) ABSTRACT

A switch includes a first contact and a second contact that are placed along an operating shaft and can reciprocate with respect to each other. An end of the second contact opposite to an end thereof on the side of the first contact is housed in a housing space of a housing box. The pressure in the housing space is increased due to an arc generated when the first contact approaches the second contact. The increased in the pressure causes the second contact to move toward the first contact.

10 Claims, 15 Drawing Sheets

(51) Int. Cl.
    *H01H 3/46*     (2006.01)
    *H01H 9/02*     (2006.01)
    *H01H 9/38*     (2006.01)
    *H01H 31/00*     (2006.01)
    *H01H 33/12*     (2006.01)
    *H01H 33/90*     (2006.01)
    *H02B 13/075*     (2006.01)

(52) U.S. Cl.
    CPC ............ *H01H 9/38* (2013.01); *H01H 31/003* (2013.01); *H01H 33/12* (2013.01); *H01H 33/901* (2013.01); *H01H 33/903* (2013.01); *H02B 13/075* (2013.01); *H01H 2205/002* (2013.01); *H01H 2235/022* (2013.01)

(58) Field of Classification Search
    USPC ...... 218/154, 12, 13, 45, 55, 56, 60, 67, 69, 218/79, 80, 82, 85, 97
    See application file for complete search history.

(56) References Cited

U.S. PATENT DOCUMENTS

| | | | |
|---|---|---|---|
| 8,106,326 B2 | 1/2012 | Nakauchi et al. | |
| 8,902,026 B2 * | 12/2014 | Fujita | H01H 33/182 218/22 |
| 9,117,608 B2 * | 8/2015 | Nakada | H01H 33/12 |

FOREIGN PATENT DOCUMENTS

| | | | |
|---|---|---|---|
| JP | 2009163946 A | 7/2009 | |
| JP | 2010231898 A | 10/2010 | |

* cited by examiner

FIG.5

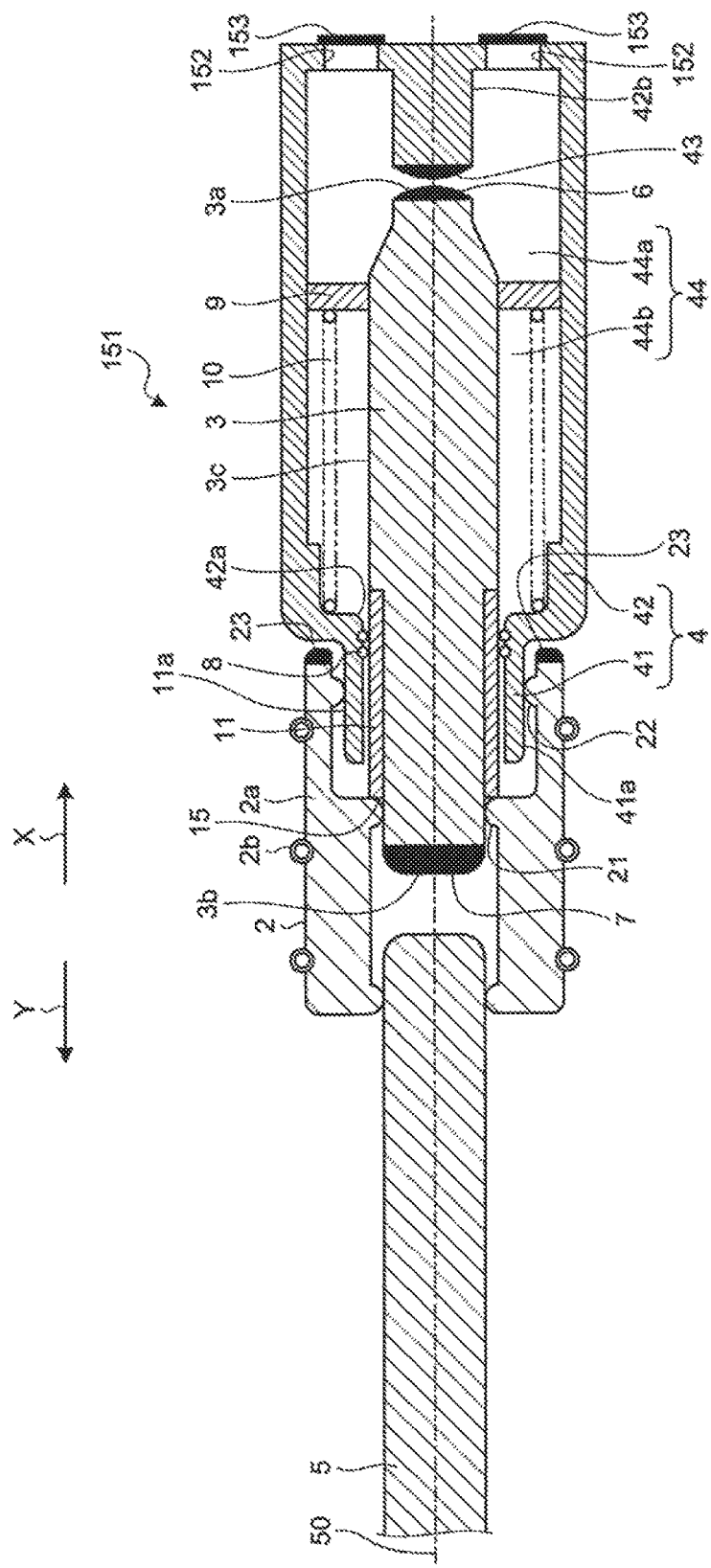

SWITCH

FIELD

The present invention relates to a switch including a fixed contact and a movable contact.

BACKGROUND

A gas insulated switchgear includes a plurality of switches for connecting and disconnecting a circuit by contact and separation between a fixed contact and a movable contact. The switch includes a ground switch used for grounding a main circuit at the time of equipment inspection. As disclosed in Patent Literature 1, the main circuit is grounded by moving the movable contact on the ground side to be brought into contact with the fixed contact on the main circuit side. The main circuit is disconnected in advance with no voltage applied to the fixed contact, when the movable contact is brought into contact with the fixed contact.

CITATION LIST

Patent Literature

Patent Literature 1: Japanese Patent Application Laid-open No. 2009-163946

SUMMARY

Technical Problem

Such a switch is in some cases required to have a duty that enables safe turn-on even when the movable contact is brought into contact with the fixed contact by mistake while the main circuit is not disconnected and closed. In order to fulfill such a duty, the duration of occurrence of an arc between the movable contact and the fixed contact needs to be reduced. The movable contact is thus operated at high speed to reduce the time from the occurrence of the arc to the contact between the movable contact and the fixed contact. A resulting problem is an increase in size and cost of an operating device to operate the movable contact at high speed.

The present invention has been made in view of the above, and an object of the present invention is to obtain a switch that can reduce the size and cost of an operating device by decreasing the operating speed of a movable contact without prolonging the duration of occurrence of an arc.

Solution to Problem

In order to solve the above problem and achieve the object, a switch according to the present invention includes: a first contact that is placed to be able to reciprocate in a first direction along an operating shaft and in a second direction opposite to the first direction; and a second contact that is placed on a side of the first direction with respect to the first contact and can reciprocate in the first direction and the second direction along the operating shaft. The switch further includes: a housing box that includes therein a housing space housing one end of the second contact on the side of the first direction, forms an opening through which the second contact can pass, and allows another end of the second contact opposite to the one end to be exposed to the outside of the housing space through the opening; a surrounding portion that is erected in the second direction from the opening of the housing box and surrounds a side surface of the second contact; and a slide contact that is placed between the second contact and the surrounding portion and is in contact with the second contact and the surrounding portion. The switch further includes: a partition that is formed integrally with a part of the second contact housed in the housing space and partitions the housing space into a first space on the side of the first direction and a second space on a side of the second direction; and an energizing portion that energizes the second contact in the first direction. The first contact, the second contact, the housing box, the surrounding portion, and the slide contact are each formed of a conductor. The partition is formed of an insulator. The first contact includes a first abutting portion that can come into contact with the side surface of the second contact, a second abutting portion that is formed on the side of the first direction with respect to the first abutting portion and can come into contact with an outer surface of the surrounding portion, and an arc generator that is placed on the side of the first direction with respect to the first abutting portion and generates an arc between the second contact and the arc generator. A facing portion that faces the one end of the second contact is formed on a part of an inner wall surface forming the first space of the housing space. An insulating guide that is made of an insulator is placed in a part of the side surface of the second contact, the part coming into contact with the slide contact in a state in which the second contact is disposed on the side of the first direction by energizing force of the energizing portion.

Advantageous Effects of Invention

The switch according to the present invention can reduce the size and increase the design flexibility of the operating device by decreasing the operating speed of the movable contact without prolonging the duration of occurrence of the arc.

BRIEF DESCRIPTION OF DRAWINGS

FIG. 5 is a view for explaining the operation of the switch according to the first embodiment.

FIG. 15 is a view for explaining the operation of the switch according to the third embodiment.

DESCRIPTION OF EMBODIMENTS

A switch according to embodiments of the present invention will now be described in detail with reference to the drawings. Note that the present invention is not limited to the embodiments.

First Embodiment

Figure 1:
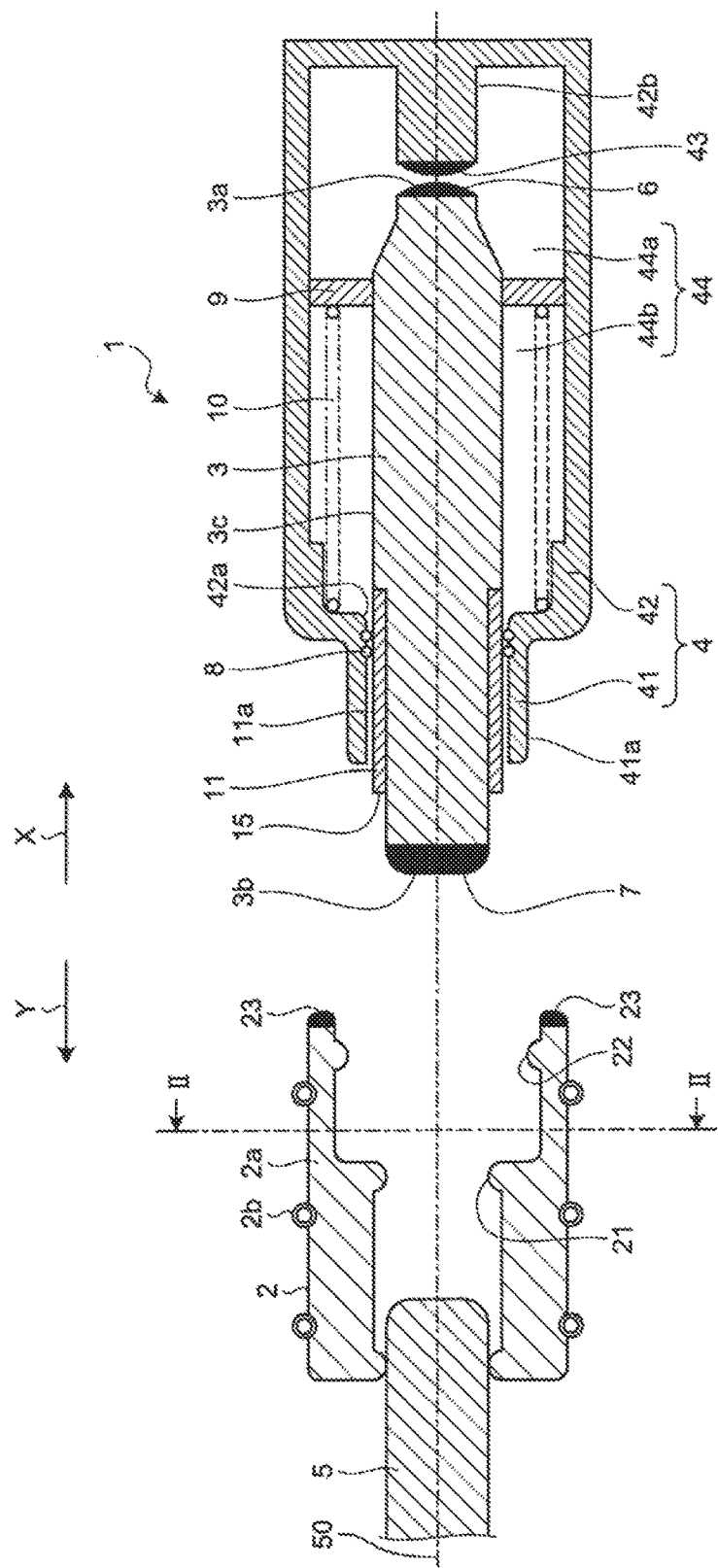
FIG. 1 is a sectional view illustrating a schematic configuration of a switch according to a first embodiment of the present invention.

FIG. 1 is a sectional view illustrating a schematic configuration of a switch according to a first embodiment of the present invention. A switch 1 which is a ground switch is used while installed in a tank (not illustrated) filled with an insulating gas such as sulfur hexafluoride ($SF_6$) gas having electrical insulation and arc-quenching properties. The switch 1 includes a main mover 5, a movable contact 2 which is a first contact, an intermediate contact 3 which is a second contact, and a guide body 4.

The main mover 5 is a rod-like member formed of a conductor and is provided to be able to reciprocate along an operating shaft 50. The movable contact 2 is a member formed of a conductor and connected to the main mover 5, and can reciprocate along the operating shaft 50 together with the main mover 5.

The intermediate contact 3 is a rod-like member formed of a conductor and faces the main mover 5 to be able to reciprocate along the operating shaft 50. In the following description, a direction parallel to the operating shaft 50 and directed from the movable contact 2 toward the intermediate contact 3 is indicated by arrow X as a first direction. Moreover, a direction parallel to the operating shaft 50 and directed from the intermediate contact 3 toward the movable contact 2 is indicated by arrow Y as a second direction.

Figure 2:
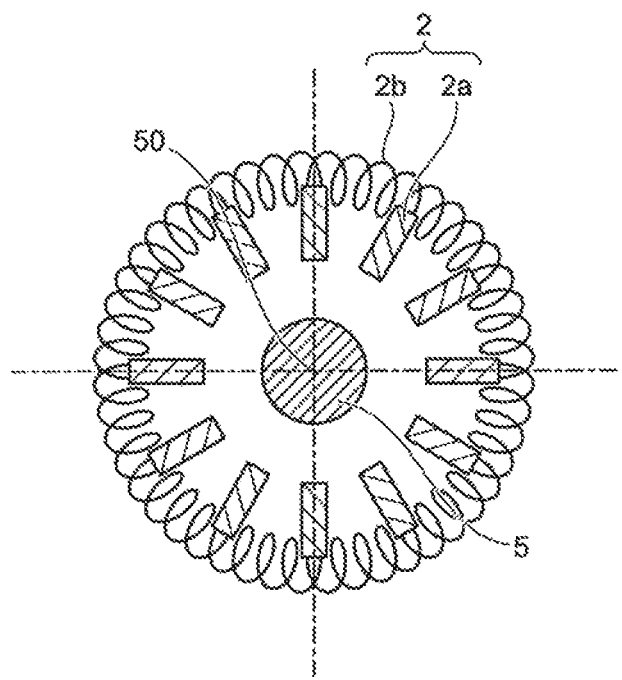
FIG. 2 is a sectional view taken along line II-II indicated in FIG. 1.

FIG. 2 is a sectional view taken along line II-II indicated in FIG. 1. The movable contact 2 is centered on the operating shaft 50 and provided around the main mover 5. The movable contact 2 includes a plurality of contact portions 2a and an energizing portion 2b. As illustrated in FIG. 2, the plurality of contact portions 2a is disposed annularly around the main mover 5. The energizing portion 2b is an annular spring member surrounding the plurality of contact portions 2a from the outside, and energizes the plurality of contact portions 2a toward the operating shaft 50.

A first abutting portion 21 is formed on the contact portion 2a of the movable contact 2 and comes into contact with a side surface 3c of the intermediate contact 3 when the movable contact 2 is moved in the direction indicated by arrow X. More specifically, the first abutting portion 21 is formed to protrude toward the operating shaft 50 from the contact portion 2a.

Moreover, a second abutting portion 22 is formed on the contact portion 2a of the movable contact 2 and comes into contact with an outer surface 41a of a surrounding portion 41 of the guide body 4 when the movable contact 2 is moved in the direction indicated by arrow X. Note that the detailed configuration of the surrounding portion 41 will be described later. The second abutting portion 22 is provided on the side indicated by arrow X relative to the first abutting portion 21. Moreover, the second abutting portion 22 is formed to protrude toward the operating shaft 50 from the contact portion 2a. The distance between the second abutting portion 22 and the operating shaft 50 is longer than the distance between the first abutting portion 21 and the operating shaft 50.

A movable arc electrode 23 being an arc generator is also formed on the contact portion 2a of the movable contact 2 and generates an arc between itself and the intermediate contact 3 in the process of movement of the movable contact 2 in the direction indicated by arrow X. The movable arc electrode 23 is provided on the side indicated by arrow X relative to the second abutting portion 22, more specifically at the tip of the movable contact on the side indicated by arrow X.

The intermediate contact 3 is provided to be able to reciprocate along the operating shaft 50 as described above. The intermediate contact 3 includes a first intermediate arc electrode 6 at one end 3a on the side indicated by arrow X and generates an arc between itself and the guide body 4. Note that a part of the guide body 4 generating the arc between itself and the first intermediate arc electrode 6 will be described in detail later. The intermediate contact 3 also includes a second intermediate arc electrode 7 at another end 3b on the side indicated by arrow Y and generates an arc between itself and the movable arc electrode 23.

The guide body 4 includes a housing box 42 formed of a conductor and the surrounding portion 41 formed of a conductor. The housing box 42 is a box-like member in which a housing space 44 is formed to house the one end 3a of the intermediate contact 3. An opening 42a through which the intermediate contact 3 can pass is formed in the housing box 42 and communicates the inside and the outside of the housing space 44. The one end 3a of the intermediate contact 3 is housed in the housing space 44, while the other end 3b is exposed to the outside of the housing space 44 through the opening 42a.

A protrusion 42b protruding toward the intermediate contact 3 is formed on a part of the inner wall surface that forms the housing space 44 of the housing box 42, the part facing the one end 3a of the intermediate contact 3. The housing box 42 includes at the tip of the protrusion 42b a box arc electrode 43 that generates an arc between itself and the first intermediate arc electrode 6 of the intermediate contact 3.

The surrounding portion 41 is erected on the side indicated by arrow Y from the opening 42a of the housing box 42 and surrounds the periphery of the side surface 3c of the intermediate contact 3. The intermediate contact 3 is supported by the surrounding portion 41 to be able to reciprocate along the operating shaft 50.

A slide contact 8 that is in contact with the surrounding portion 41 and the intermediate contact 3 is provided between the surrounding portion 41 and the intermediate contact 3. The slide contact 8 is, for example, a spring that is fitted into a groove formed on the inner surface of the surrounding portion 41. The slide contact 8 is in contact with the surrounding portion 41 and the intermediate contact 3 even at the time of movement of the intermediate contact 3. When the movable contact 2 is moved in the direction indicated by arrow X, the second abutting portion 22 of the movable contact 2 is brought into contact with the outer surface 41a of the surrounding portion 41. The surrounding portion 41 thus functions as a fixed contact that is brought into contact with the movable contact 2 as well as holding the intermediate contact 3.

A partition 9 formed of an insulator is provided on a part of the side surface 3c of the intermediate contact 3 housed in the housing box 42. The partition 9 is formed integrally with the intermediate contactor 3 and can reciprocate within the housing space 44 of the housing box 42 together with the intermediate contact 3. The partition 9 is erected perpendicular to the operating shaft 50 from the side surface 3c of the intermediate contact 3, thereby partitioning the housing space 44 inside the housing box 42 into a first space 44a and a second space 44b.

The first space 44a is provided on the side indicated by arrow X relative to the second space 44b. The first intermediate arc electrode 6 formed at the one end 3a of the intermediate contact 3 and the box arc electrode 43 provided in the housing space 44 of the housing box 42 are placed in the first space 44a.

An energizing portion 10 that energizes the intermediate contact 3 in the direction indicated by arrow X is provided in the second space 44b. The energizing portion 10 of the first embodiment is a compression spring and energizes the partition 9 in the direction indicated by arrow X to energize the intermediate contact 3 integrated with the partition 9 in the direction indicated by arrow X.

A gap is formed between the first intermediate arc electrode 6 of the intermediate contact 3 and the box arc electrode 43 of the housing box 42 in a state where the intermediate contact 3 is moved in the direction indicated by arrow X by the energizing force of the energizing portion 10. In order to form the gap between the first intermediate arc electrode 6 of the intermediate contact 3 and the box arc electrode 43 of the housing box 42, for example, a protrusion may be formed on the inner wall surface of the housing space 44 to come into contact with the partition 9 before the first intermediate arc electrode 6 is moved to a position in contact with the box arc electrode 43, thereby restricting further movement of the partition 9 in the direction indicated by arrow X.

An insulating guide 11 formed of an insulator covers a part of the side surface 3c of the intermediate contact 3 that faces the inner surface of the surrounding portion 41 in a state where the intermediate contact 3 is moved in the direction indicated by arrow X by the energizing force of the energizing portion 10. Thus, the guide body 4 is not electrically connected to the intermediate contact 3 in the state where the intermediate contact 3 is moved in the direction indicated by arrow X by the energizing force of the energizing portion 10 as illustrated in FIG. 1.

The part of the side surface 3c of the intermediate contact 3 covered with the insulating guide 11 and a part on the side indicated by arrow Y relative to the part covered with the insulating guide are thinner than the other parts, so that an outer surface 11a of the insulating guide 11 is flush with the side surface 3c of the intermediate contact 3. The intermediate contact 3 can thus reciprocate smoothly. The insulating guide 11 does not cover a certain region of the side surface 3c of the intermediate contact 3 from the other end 3b.

The end of the insulating guide 11 on the side indicated by arrow Y serves as a regulating portion 15 that comes into contact with the first abutting portion 21 when the movable contact 2 is moved in the direction indicated by arrow X.

Next, the operation of the switch 1 according to the first embodiment will be described, where the movable contact 2 is moved in the direction indicated by arrow X from the state illustrated in FIG. 1 until the second abutting portion 22 of the movable contact 2 is brought into contact with the surrounding portion 41 of the guide body 4. FIGS. 3 to 6 are views for explaining the operation of the switch 1 according to the first embodiment.

Figure 3:
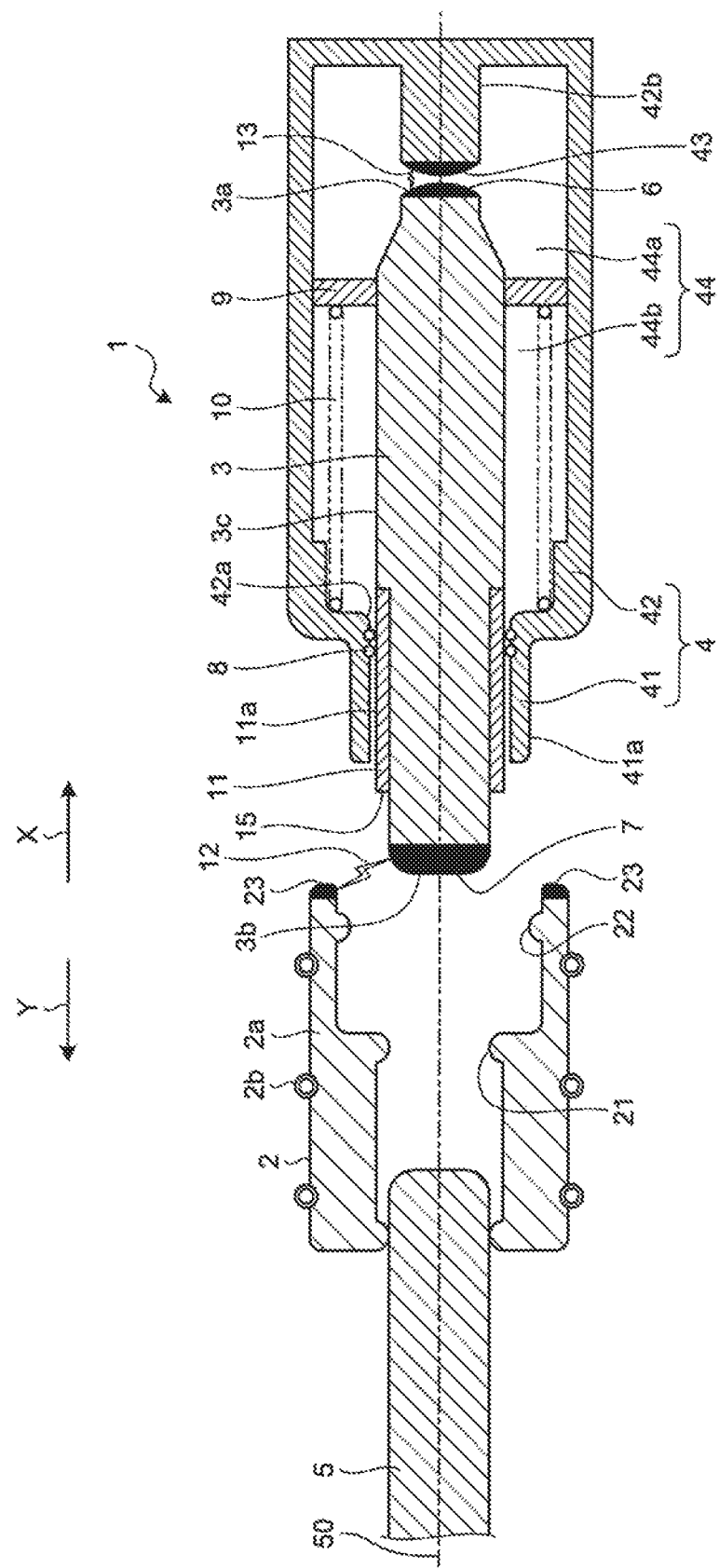
FIG. 3 is a view for explaining the operation of the switch according to the first embodiment.

When the movable contact 2 is moved in the direction indicated by arrow X, as illustrated in FIG. 3, the distance between the movable arc electrode 23 of the movable contact 2 and the second intermediate arc electrode 7 of the intermediate contact 3 is reduced. An arc 12 occurs at this time between the movable arc electrode 23 and the second intermediate arc electrode 7 when a voltage is applied to the guide body 4. At the same time, an arc 13 also occurs between the first intermediate arc electrode 6 of the intermediate contact 3 and the box arc electrode 43.

Figure 4:
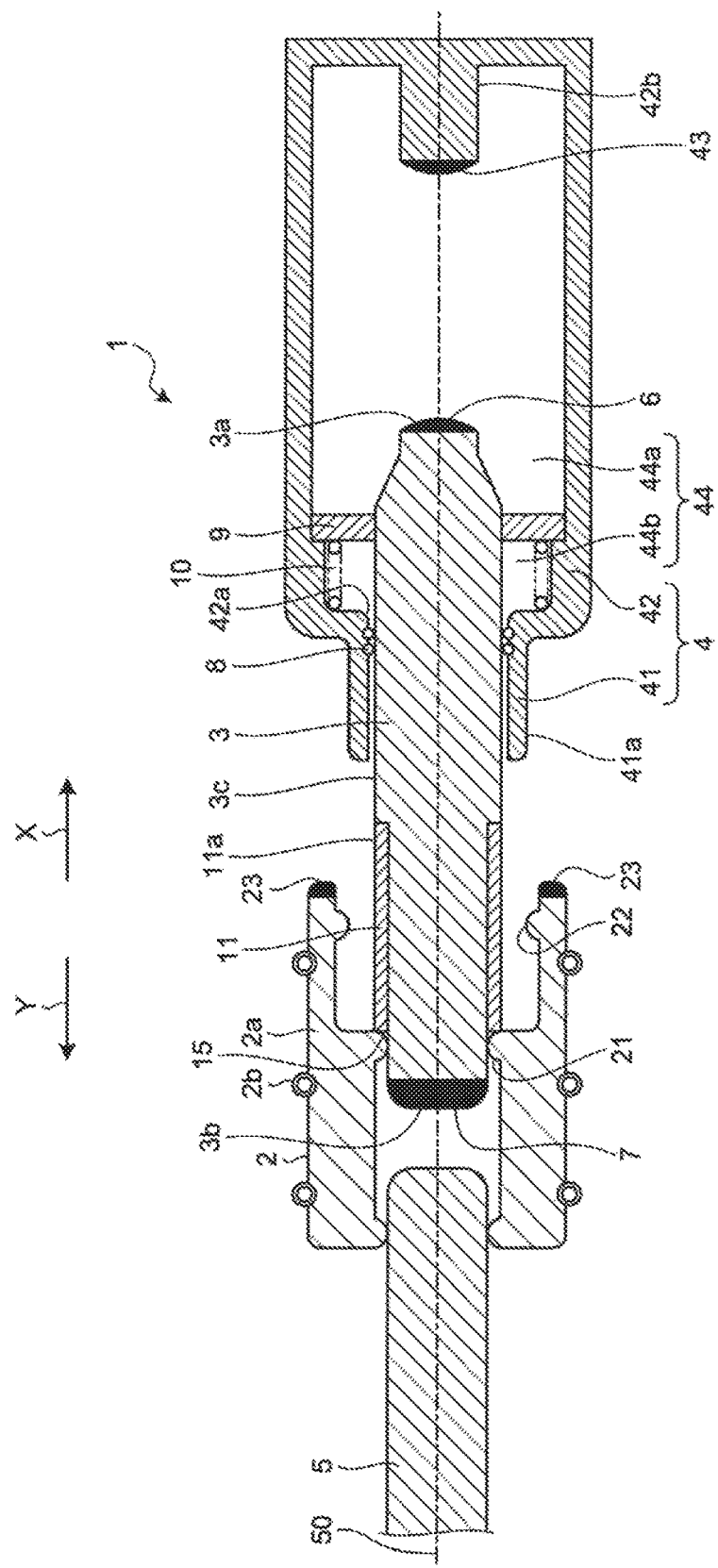
FIG. 4 is a view for explaining the operation of the switch according to the first embodiment.

The occurrence of the arc 13 causes an increase in temperature inside the first space 44a and thus an increase in pressure inside the first space 44a. The increase in pressure inside the first space 44a causes the partition 9 and the intermediate contact 3 to move in the direction indicated by arrow Y against the energizing force of the energizing portion 10, as illustrated in FIG. 4.

The movement of the intermediate contact 3 causes a part of the side surface 3c of the intermediate contact 3 not covered with the insulating guide 11 to face the surrounding portion 41. The intermediate contact 3 is thus electrically connected to the guide body 4 via the slide contact 8. Moreover, the first abutting portion 21 of the movable contact 2 is brought into contact with the side surface 3c of the intermediate contact 3. As a result, the arc 12 between the movable arc electrode 23 and the second intermediate arc electrode 7 is quenched.

When the movable contact 2 is moved further in the direction indicated by arrow X from the above state, the first abutting portion 21 comes into contact with the regulating portion 15 of the insulating guide 11 and pushes the intermediate contact 3 in the direction indicated by arrow X.

Figure 5:
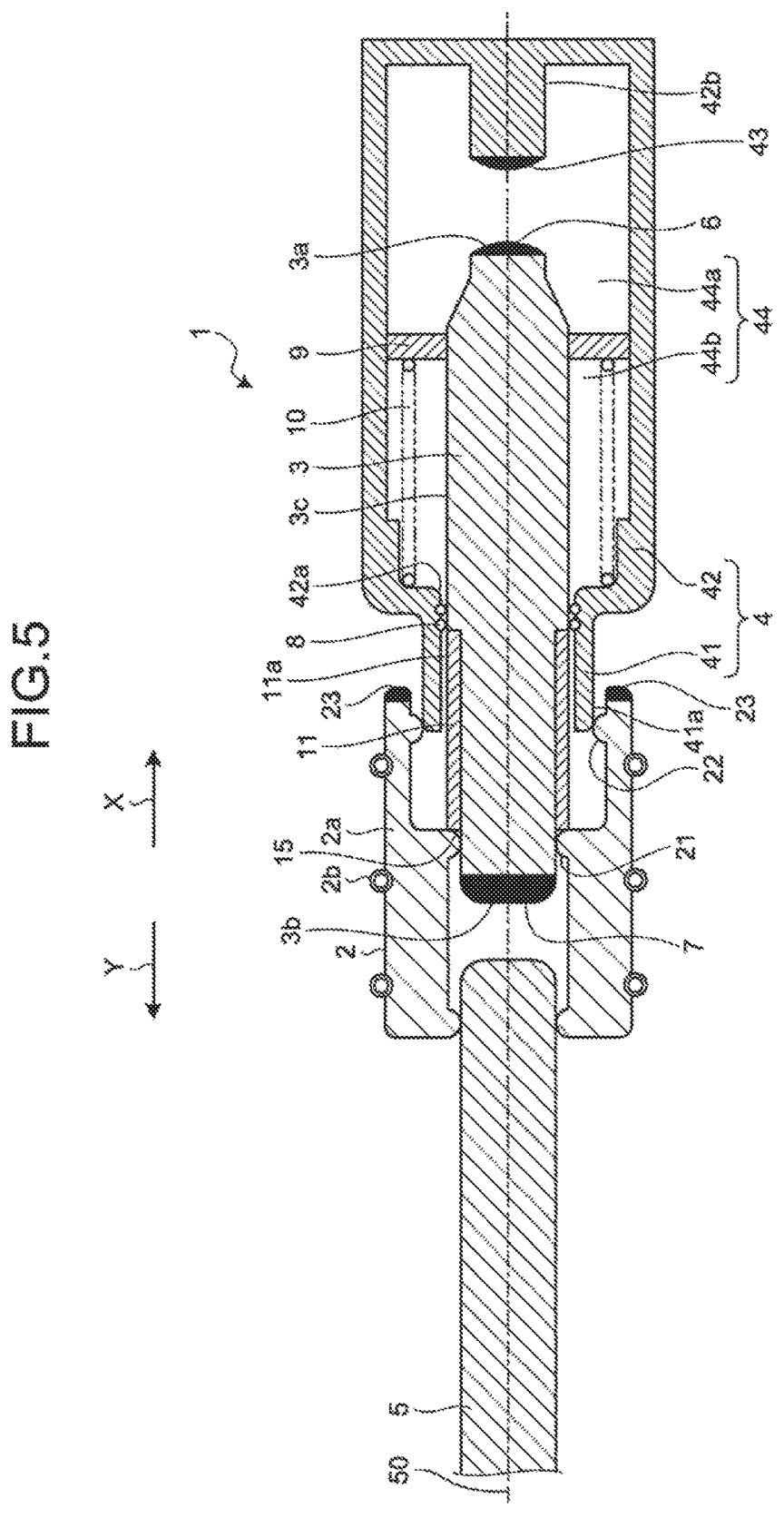

Then, as illustrated in FIG. 5, the second abutting portion 22 of the movable contact 2 comes into contact with the outer surface 41a of the surrounding portion 41 before the insulating guide 11 is moved to the position facing the slide contact 8, whereby the electrical connection between the movable contact 2 and the guide body 4 is secured.

Figure 6:
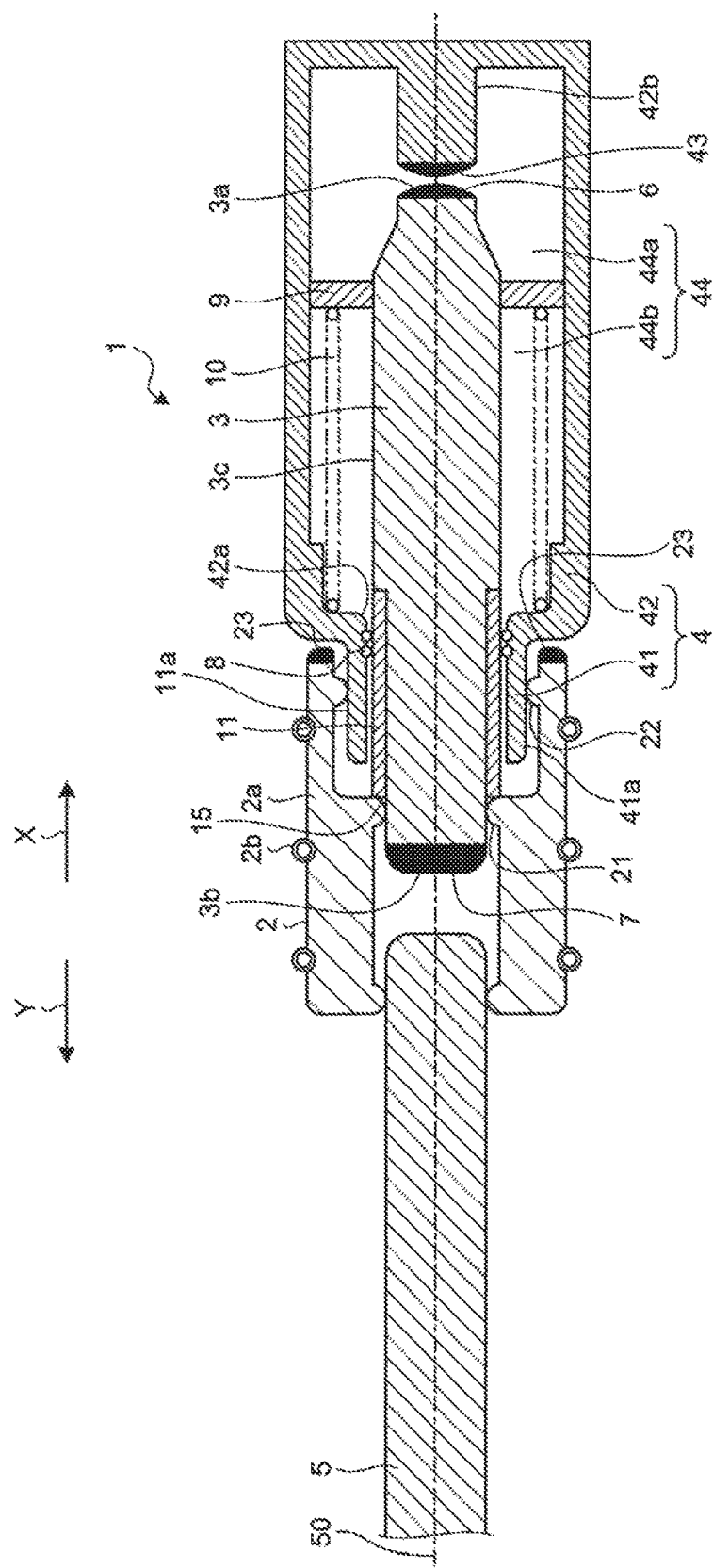
FIG. 6 is a view for explaining the operation of the switch according to the first embodiment.

When the movable contact 2 is moved further in the direction indicated by arrow X, as illustrated in FIG. 6, the intermediate contact 3 returns to the position of the initial state illustrated in FIG. 1 so that the second abutting portion 22 of the movable contact 2 is in contact with the outer surface 41a of the surrounding portion 41. In the case where the switch 1 is the ground switch, grounding is completed once the second abutting portion 22 of the movable contact 2 comes into contact with the outer surface 41a of the surrounding portion 41 which is the fixed contact.

The switch can return to the initial state illustrated in FIG. 1 by moving the movable contact 2 in the direction indicated by arrow Y from the state illustrated in FIG. 6. Note that when an ablation material is disposed in the first space 44a, the increase in temperature on the occurrence of the arc 13 causes the ablation material to evaporate so that the rise in the pressure inside the first space 44a can be increased to be able to move the intermediate contact 3 faster in the direction indicated by arrow Y. The ablation material may be, for example, a material made of one or more of polyamide 6, polyamide 66, and polyamide 46. Alternatively, the ablation material may be a material in which one of polyamide 6, polyamide 66, and polyamide 46 is used as a base material and impregnated with melamine or boron nitride. Yet alternatively, the ablation material may be a material made of one or more of polyethylene, polyacetal (POM), polytetrafluoroethylene (PTFE), and poly (methyl methacrylate) (PMMA).

According to the switch 1 described above, the occurrence of the arc 12 and the arc 13 triggers the movement of the intermediate contact 3 toward the movable contact 2 so that, after the occurrence of the arc 12 and the arc 13, the movable contact 2 and the intermediate contact 3 approach each other at a relative speed which is a sum of the speed of movement of the movable contact 2 and the speed of movement of the intermediate contact 3.

Here, the duration of occurrence of the arc 12 is desirably reduced in order to prevent the arc 12 from breaking the movable contact 2 and the intermediate contact 3. If the same duration of occurrence of the arc 12 is required to prevent breakage of the movable contact 2 and the intermediate contact 3, the switch 1 according to the first embodiment that moves the intermediate contact 3 toward the movable contact 2 can decrease the speed of movement of the movable contact 2 as compared with a configuration in which only the movable contact 2 is moved. That is, the speed of movement of the movable contact 2 can be decreased while reducing the duration of occurrence of the arc.

As described above, the switch 1 according to the first embodiment can decrease the speed of movement of the movable contact 2 while reducing the duration of occurrence of the arc, thereby being able to reduce the size and cost of an operating device (not illustrated) that operates the movable contact 2 and reduce the size and cost of the switch 1 including the operating device.

Note that the movable arc electrode 23, the first intermediate arc electrode 6, the second intermediate arc electrode 7, and the box arc electrode 43 are each desirably made of an arc resistant material in order to prevent breakage by the arc 12 and the arc 13. Moreover, the switch 1 may be used as a disconnect switch other than the ground switch.

Furthermore, although the gap is formed between the first intermediate arc electrode 6 of the intermediate contact 3 and the box arc electrode 43 of the housing box 42 in the first embodiment, the first intermediate arc electrode 6 of the intermediate contact 3 may be in contact with the box arc electrode 43 of the housing box 42. In this case, a current flows between the first intermediate arc electrode 6 and the box arc electrode 43 on the occurrence of the arc 12 between the movable arc electrode 23 of the movable contact 2 and the second intermediate arc electrode 7 of the intermediate contact 3, so that a repulsive force is generated between the first intermediate arc electrode 6 and the box arc electrode 43. The repulsive force causes the intermediate contact 3 to move in the direction indicated by arrow Y, whereby a gap is formed between the first intermediate arc electrode 6 and the box arc electrode 43 to cause the occurrence of the arc 13. The occurrence of the arc 13 allows the intermediate contact 3 to be moved in the direction indicated by arrow Y against the energizing force of the energizing portion 10 as described above.

Second Embodiment

Figure 7:
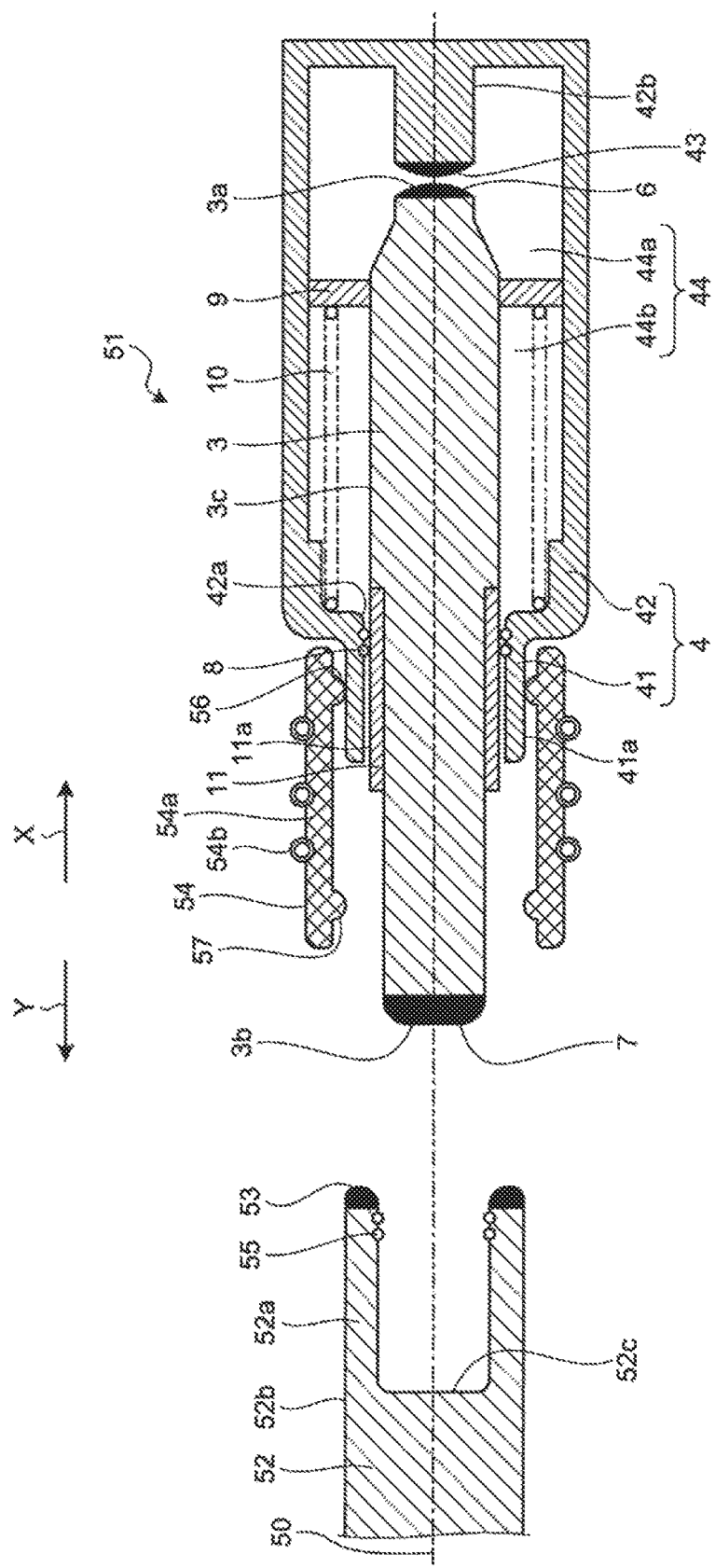
FIG. 7 is a sectional view illustrating a schematic configuration of a switch according to a second embodiment of the present invention.

FIG. 7 is a sectional view illustrating a schematic configuration of a switch according to a second embodiment of the present invention. Note that a configuration similar to that of the first embodiment will be assigned a reference numeral similar to that assigned to such configuration in the first embodiment and will not be described in detail. In a switch 51 according to the second embodiment, a fixed contact 54 which is a third contact configured similarly to the movable contact 2 of the first embodiment is provided around the surrounding portion 41.

The fixed contact 54 includes contact portions 54a and an energizing portion 54b. The plurality of contact portions 54a is disposed annularly around the surrounding portion 41. The energizing portion 54b is an annular spring member surrounding the plurality of contact portions 54a from the outside, and energizes the plurality of contact portions 54a toward the operating shaft 50.

A second abutting portion 56 in contact with the outer surface 41a of the surrounding portion 41 is formed on the contact portion 54a of the fixed contact 54. A third abutting portion 57 is also formed on the contact portion 54a of the fixed contact 54 and comes into contact with a side surface 52b of a movable contact 52 when the movable contact 52 is moved in the direction indicated by arrow X. The third abutting portion 57 is provided on the side indicated by arrow Y relative to the second abutting portion 56.

A protrusion 52a protruding in the direction indicated by arrow X is formed on the movable contact 52 which is the first contact. The tip of the protrusion 52a of the movable contact 52 includes a movable arc electrode 53 which is an arc generator generating an arc between itself and the second intermediate arc electrode 7 of the intermediate contact 3.

A slide contact 55 is also provided at the protrusion 52a on the side indicated by arrow Y relative to the movable arc electrode 53. The slide contact 55 is a first abutting portion that comes into contact with the side surface 3c of the intermediate contact 3 when the movable contact 52 is moved in the direction indicated by arrow X.

Figure 8:
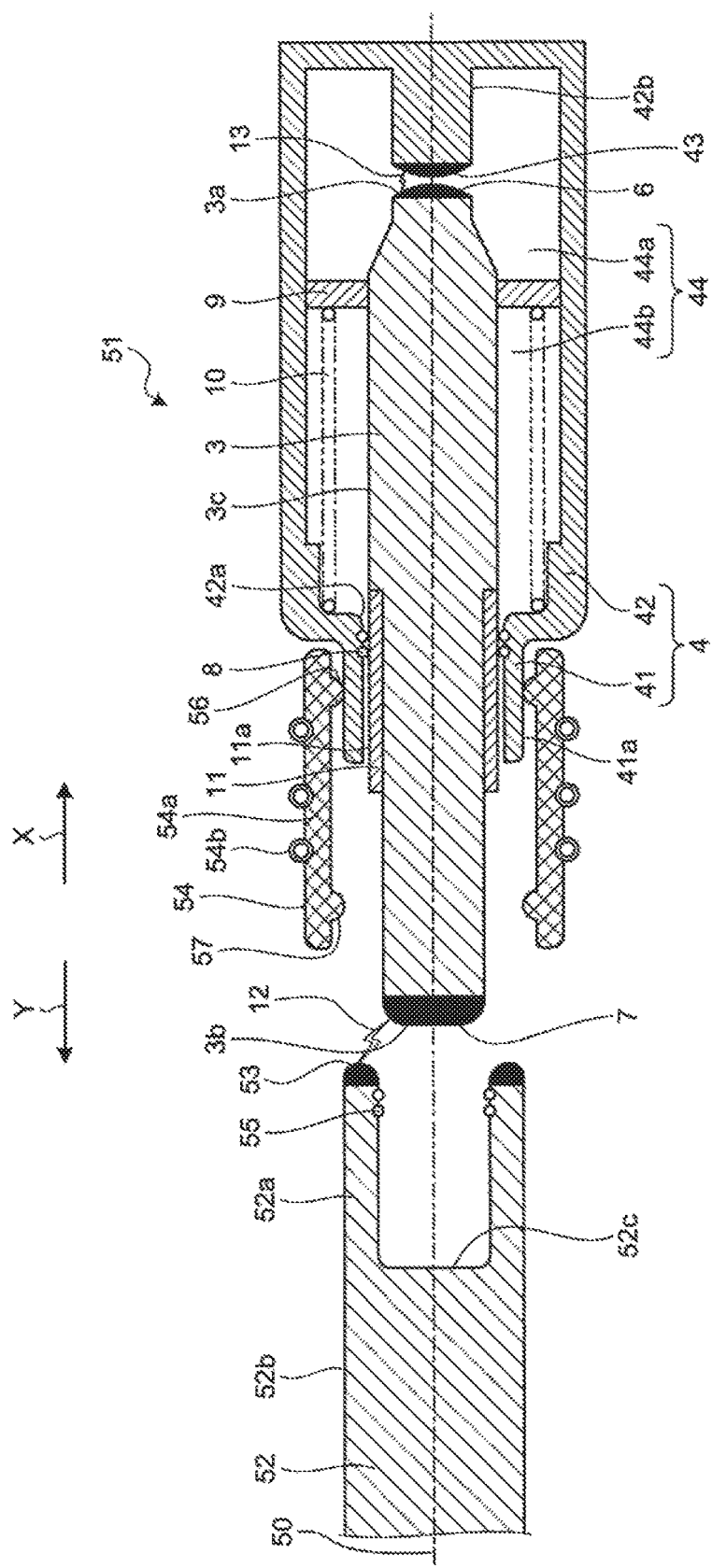
FIG. 8 is a view for explaining the operation of the switch according to the second embodiment.
Figure 9:
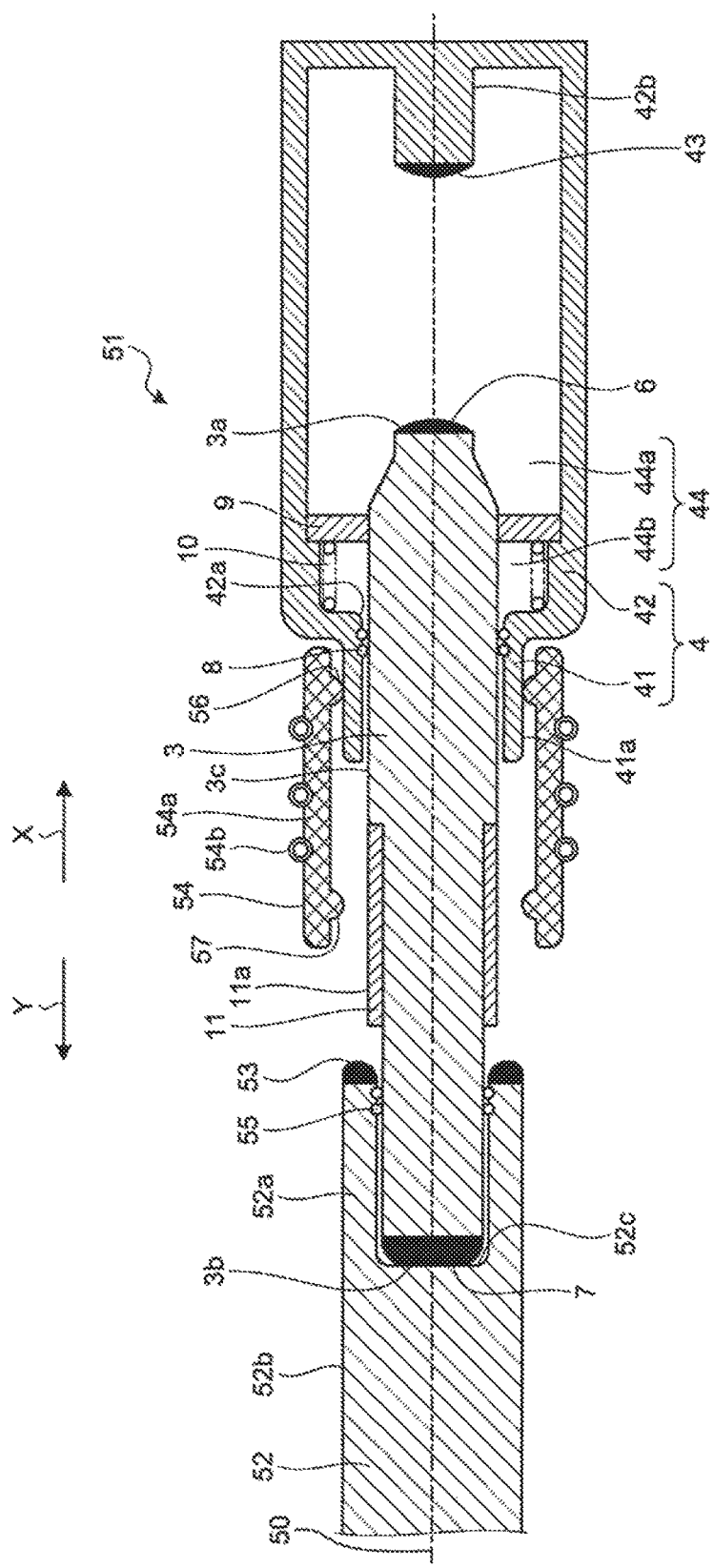
FIG. 9 is a view for explaining the operation of the switch according to the second embodiment.
Figure 10:
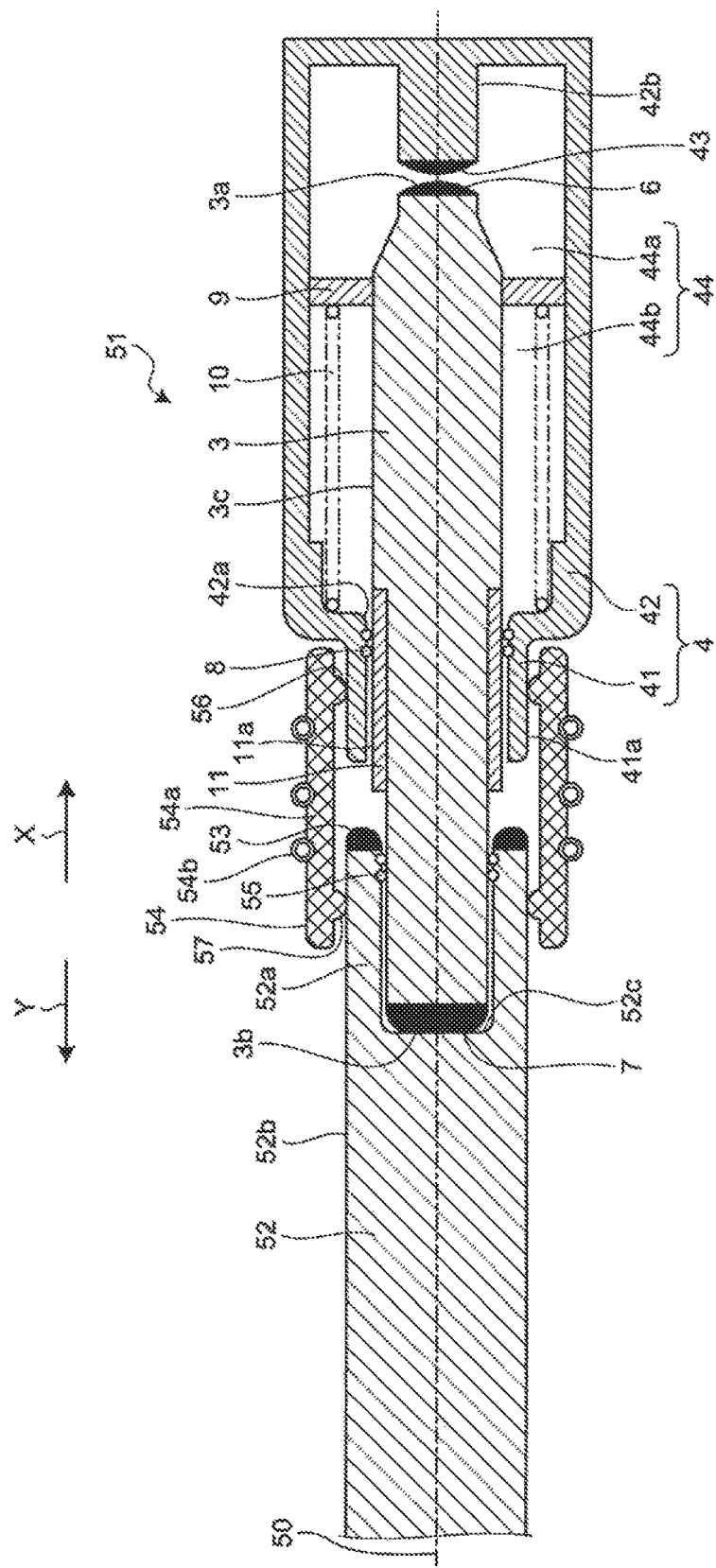
FIG. 10 is a view for explaining the operation of the switch according to the second embodiment.

Next, the operation of the switch 51 according to the second embodiment will be described, where the movable contact 52 is moved in the direction indicated by arrow X from the state illustrated in FIG. 7 until the side surface 52b of the movable contact 52 is brought into contact with the third abutting portion 57 of the fixed contact 54. FIGS. 8 to 10 are views for explaining the operation of the switch 51 according to the second embodiment.

When the movable contact 52 is moved in the direction indicated by arrow X, as illustrated in FIG. 8, the distance between the movable contact 52 and the intermediate contact 3 is reduced. The arc 12 occurs at this time between the movable arc electrode 53 of the movable contact 52 and the second intermediate arc electrode 7 of the intermediate contact 3 when a voltage is applied to the guide body 4. The arc 13 also occurs between the first intermediate arc electrode 6 of the intermediate contact 3 and the box arc electrode 43.

The occurrence of the arc 13 causes an increase in temperature inside the first space 44a and thus an increase in pressure inside the first space 44a. The increase in pressure inside the first space 41a causes the partition 9 and the intermediate contact 3 to move in the direction indicated by arrow Y against the energizing force of the energizing portion 10, as illustrated in FIG. 9.

The movement of the intermediate contact 3 causes a part of the side surface 3c of the intermediate contact 3 not covered with the insulating guide 11 to face the surrounding portion 41. The intermediate contact 3 is thus electrically connected to the guide body 4 via the slide contact 55. Moreover, the slide contact 55 of the movable contact 52 is brought into contact with the side surface 3c of the intermediate contact 3. As a result, the arc 12 between the movable arc electrode 53 and the second intermediate arc electrode 7 is quenched.

When the movable contact 52 is moved further in the direction indicated by arrow X from the above state, a facing portion 52c of the movable contact 52 facing the intermediate contact 3 comes into contact with the other end 3b of the intermediate contact 3 and pushes the intermediate contact 3 in the direction indicated by arrow X. Note that as in the first embodiment, the movable arc electrode 53 of the movable contact 52 may be configured to be in contact with the regulating portion 15 of the insulating guide 11.

Then, as illustrated in FIG. 10, the intermediate contact 3 returns to the position of the initial state illustrated in FIG. 7 so that the side surface 52b of the movable contact 52 is in contact with the third abutting portion 57 of the fixed contact 54. In the case where the switch 51 is the ground switch, grounding is completed once the side surface 52b of the movable contact 52 comes into contact with the third abutting portion 57 of the fixed contact 54 which is a main contact on the fixed side.

The switch can return to the initial state illustrated in FIG. 7 by moving the movable contact 52 in the direction indicated by arrow Y from the state illustrated in FIG. 10. Note that when an ablation material is disposed in the first space 44a, the increase in temperature on the occurrence of the arc 13 causes the ablation material to evaporate so that the rise in the pressure inside the first space 44a can be increased to be able to move the intermediate contact 3 faster in the direction indicated by arrow Y.

According to the switch 51 described above, the occurrence of the arc 12 and the arc 13 triggers the movement of the intermediate contact 3 toward the movable contact 52 so that, after the occurrence of the arc 12 and the arc 13, the movable contact 52 and the intermediate contact 3 approach each other at a relative speed which is a sum of the speed of movement of the movable contact 52 and the speed of movement of the intermediate contact 3.

Thus, as with the first embodiment, the switch 51 according to the second embodiment can decrease the speed of movement of the movable contact 52 to be able to reduce the size and cost of an operating device (not illustrated) that operates the movable contact 52 and reduce the size and cost of the switch 51 including the operating device.

Note that the movable arc electrode 53, the first intermediate arc electrode 6, the second intermediate arc electrode 7, and the box arc electrode 43 are each desirably made of an arc resistant material in order to prevent breakage by the arc 12 and the arc 13.

Furthermore, although the gap is formed between the first intermediate arc electrode 6 of the intermediate contact 3 and the box arc electrode 43 of the housing box 42 in the second embodiment, the first intermediate arc electrode 6 of the intermediate contact 3 may be in contact with the box arc electrode 43 of the housing box 42. In this case, a current flows between the first intermediate arc electrode 6 and the box arc electrode 43 on the occurrence of the arc 12 between the movable arc electrode 53 of the movable contact 52 and the second intermediate arc electrode 7 of the intermediate contact 3, so that a repulsive force is generated between the first intermediate arc electrode 6 and the box arc electrode 43. The repulsive force causes the intermediate contact 3 to move in the direction indicated by arrow Y, whereby a gap is formed between the first intermediate arc electrode 6 and the box arc electrode 43 to cause the occurrence of the arc 13. The occurrence of the arc 13 allows the intermediate contact 3 to be moved in the direction indicated by arrow Y against the energizing force of the energizing portion 10 as described above.

Third Embodiment

Figure 11:
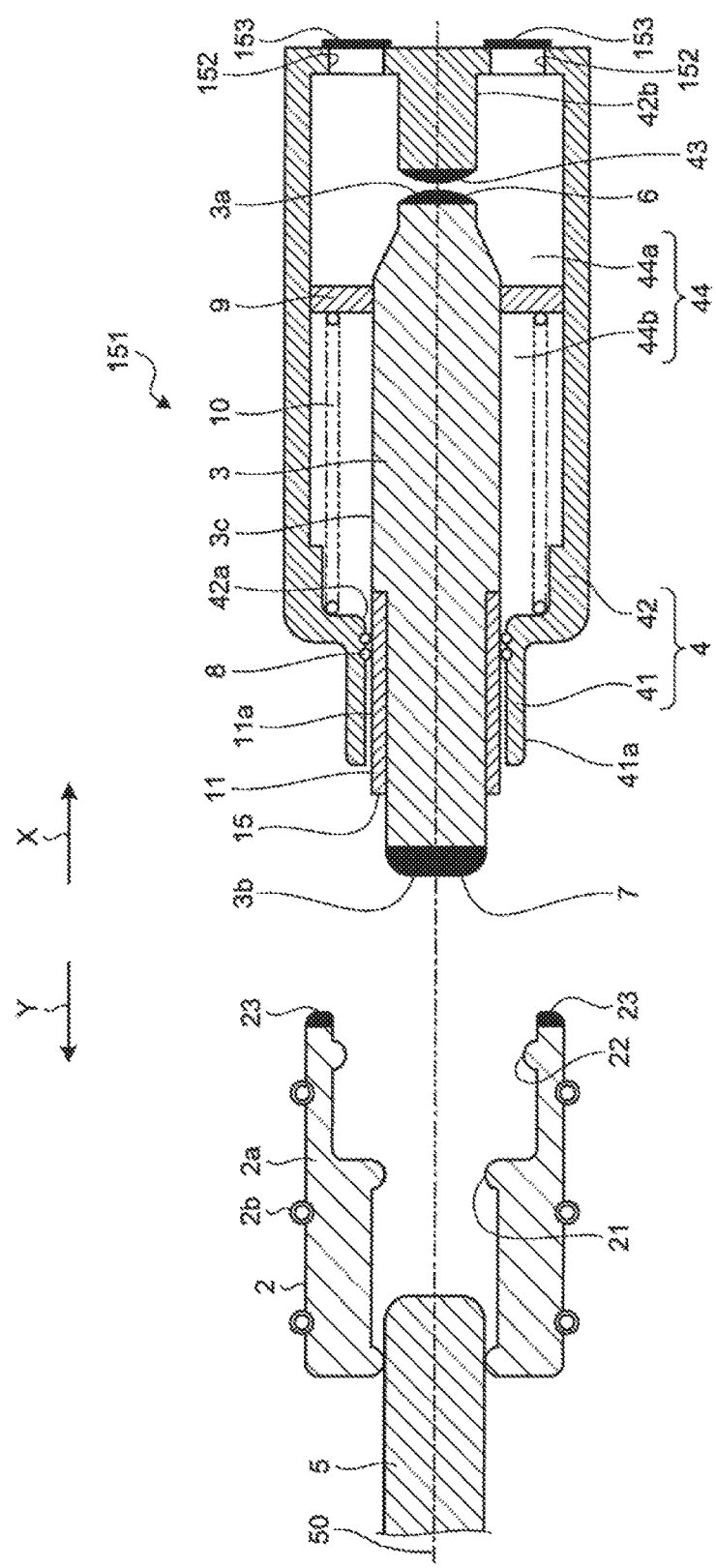
FIG. 11 is a sectional view illustrating a schematic configuration of a switch according to a third embodiment of the present invention.

FIG. 11 is a sectional view illustrating a schematic configuration of a switch 151 according to a third embodiment of the present invention. Note that a configuration similar to that of the first embodiment will be assigned a reference numeral similar to that assigned to such configuration in the first embodiment and will not be described in detail. In the switch 151 according to the third embodiment, communication holes 152 that communicate the inside and the outside of the housing space 44 are formed on a surface of the housing box 42 in contact with the first space 44a in a state where the intermediate contact 3 is positioned on the side indicated by arrow X as illustrated in FIG. 11.

The communication holes 152 are each closed by a valve 153. The valve 153 is a relief valve that opens the communication hole 152 when the pressure inside the first space 44a exceeds a certain pressure. The operation of the switch 151 configured as described above will be described, where the movable contact 2 is moved in the direction indicated by arrow X from the state illustrated in FIG. 11 until the second abutting portion 22 of the movable contact 2 is brought into contact with the surrounding portion 41 of the guide body 4. FIGS. 12 to 15 are views for explaining the operation of the switch 151 according to the third embodiment.

Figure 12:
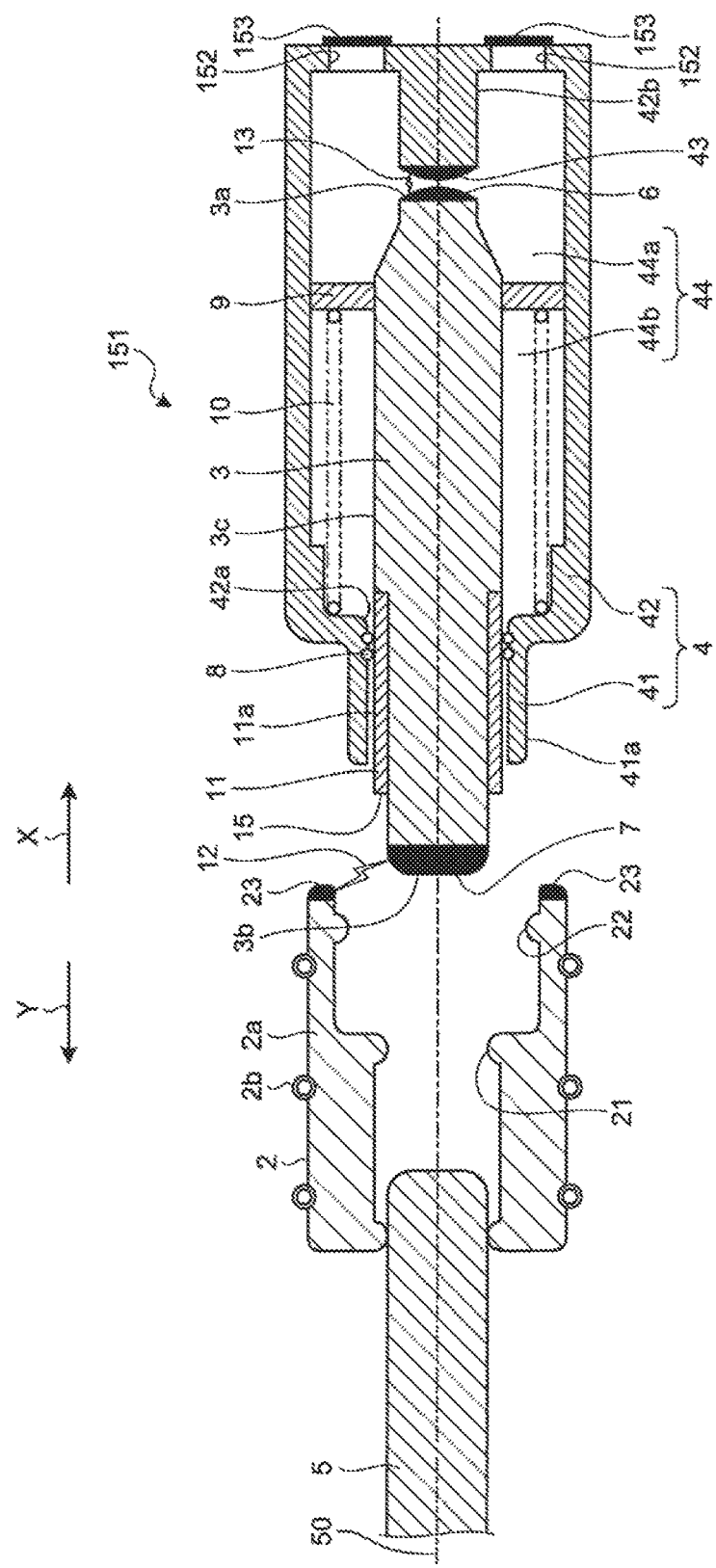
FIG. 12 is a view for explaining the operation of the switch according to the third embodiment.

When the movable contact 2 is moved in the direction indicated by arrow X, as illustrated in FIG. 12, the distance between the movable arc electrode 23 of the movable contact 2 and the second intermediate arc electrode 7 of the intermediate contact 3 is reduced. An arc 12 occurs at this time between the movable arc electrode 23 and the second intermediate arc electrode 7 when a voltage is applied to the guide body 4. At the same time, an arc 13 also occurs between the first intermediate arc electrode 6 of the intermediate contact 3 and the box arc electrode 43.

Figure 13:
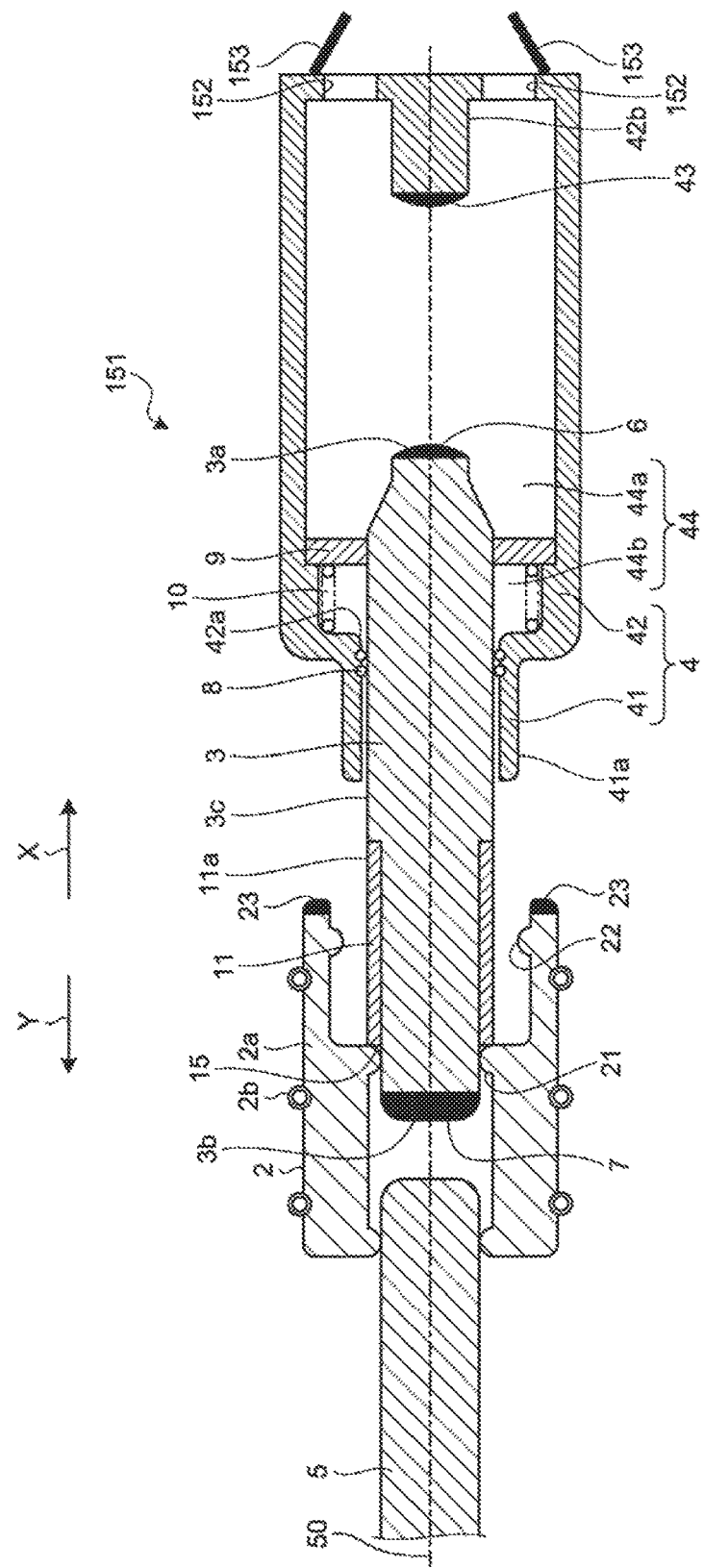
FIG. 13 is a view for explaining the operation of the switch according to the third embodiment.

The occurrence of the arc 13 causes an increase in temperature inside the first space 44a and thus an increase in pressure inside the first space 44a. The increase in pressure inside the first space 44a causes the partition 9 and the intermediate contact 3 to move in the direction indicated by arrow Y against the energizing force of the energizing portion 10, as illustrated in FIG. 13.

The movement of the intermediate contact 3 causes a part of the side surface 3c of the intermediate contact 3 not covered with the insulating guide 11 to face the surrounding portion 41. The intermediate contact 3 is thus electrically connected to the guide body 4 via the slide contact 8. Moreover, the first abutting portion 21 of the movable contact 2 is brought into contact with the side surface 3c of the intermediate contact 3. As a result, the arc 12 between the movable arc electrode 23 and the second intermediate arc electrode 7 is quenched. Here, when the pressure inside the first space 44a exceeds the certain pressure, the valve 153 opens the communication hole 152 to be able to prevent an excessive rise in the pressure inside the first space 44a.

When the movable contact 2 is moved further in the direction indicated by arrow X from the above state, the first abutting portion 21 comes into contact with the regulating portion 15 of the insulating guide 11 and pushes the intermediate contact 3 in the direction indicated by arrow X. Here, the valve 153 opens the communication hole 152 as well when the pressure inside the first space 44a exceeds the certain pressure at the time the movable contact 2 pushes the intermediate contact 3. The pressure inside the first space 44a is reduced as a result so that the movable contact 2 can push the intermediate contact 3 more smoothly than in the state where the pressure inside the first space 44a remains high.

Figure 14:
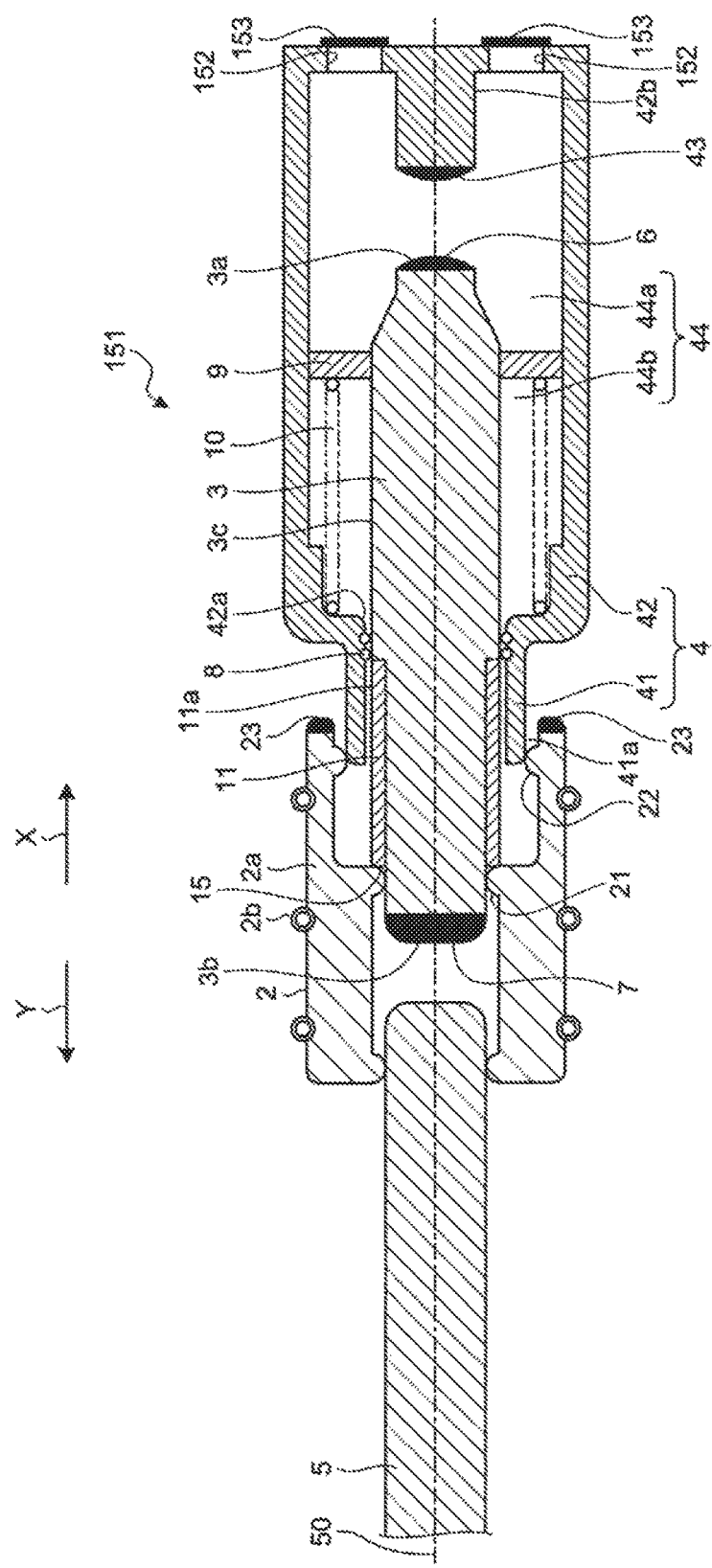
FIG. 14 is a view for explaining the operation of the switch according to the third embodiment.

Then, as illustrated in FIG. 14, the second abutting portion 22 of the movable contact 2 comes into contact with the outer surface 41a of the surrounding portion 41 before the insulating guide 11 is moved to the position facing the slide contact 8, whereby the electrical connection is secured between the movable contact 2 and the guide body 4.

When the movable contact 2 is moved further in the direction indicated by arrow X, as illustrated in FIG. 15, the intermediate contact 3 returns to the position of the initial state illustrated in FIG. 11 so that the second abutting portion 22 of the movable contact 2 is in contact with the outer surface 41a of the surrounding portion 41. In the case where the switch 151 is the ground switch, grounding is completed once the second abutting portion 22 of the movable contact 2 comes into contact with the outer surface 41a of the surrounding portion 41 which is the fixed contact.

The switch can return to the initial state illustrated in FIG. 11 by moving the movable contact 2 in the direction indicated by arrow Y from the state illustrated in FIG. 15. Note that when an ablation material is disposed in the first space 44a, the increase in temperature on the occurrence of the arc 13 causes the ablation material to evaporate so that the rise in the pressure inside the first space 44a can be increased to be able to move the intermediate contact 3 faster in the direction indicated by arrow Y. The ablation material may be, for example, a material made of one or more of polyamide 6, polyamide 66, and polyamide 46. Alternatively, the ablation material may be a material in which one of polyamide 6, polyamide 66, and polyamide 46 is used as a base material and impregnated with melamine or boron nitride. Yet alternatively, the ablation material may be a material made of one or more of polyethylene, polyacetal (POM), polytetrafluoroethylene (PTFE), and poly (methyl methacrylate) (PMMA).

According to the switch 151 described above, the occurrence of the arc 12 and the arc 13 triggers the movement of the intermediate contact 3 toward the movable contact 2 so that, after the occurrence of the arc 12 and the arc 13, the movable contact 2 and the intermediate contact 3 approach each other at a relative speed which is a sum of the speed of movement of the movable contact 2 and the speed of movement of the intermediate contact 3.

Thus, as with the first embodiment, the switch 151 according to the third embodiment can decrease the speed of movement of the movable contact 2 to be able to reduce the size and cost of an operating device not illustrated) that operates the movable contact 2 and reduce the size and cost of the switch 151 including the operating device.

Note that the movable arc electrode 23, the first intermediate arc electrode 6, the second intermediate arc electrode 7, and the box arc electrode 43 are each desirably made of an arc resistant material in order to prevent breakage by the arc 12 and the arc 13. Moreover, the switch 151 may be used as a disconnect switch other than the ground switch.

Furthermore, although the gap is formed between the first intermediate arc electrode 6 of the intermediate contact 3 and the box arc electrode 43 of the housing box 42 in the third embodiment, the first intermediate arc electrode 6 of the intermediate contact 3 may be in contact with the box arc electrode 43 of the housing box 42. In this case, a current flows between the first intermediate arc electrode 6 and the box arc electrode 43 on the occurrence of the arc 12 between the movable arc electrode 23 of the movable contact 2 and the second intermediate arc electrode 7 of the intermediate contact 3, so that a repulsive force is generated between the first intermediate arc electrode 6 and the box arc electrode 43. The repulsive force causes the intermediate contact 3 to move in the direction indicated by arrow Y, whereby a gap is formed between the first intermediate arc electrode 6 and the box arc electrode 43 to cause the occurrence of the arc 13. The occurrence of the arc 13 allows the intermediate contact 3 to be moved in the direction indicated by arrow Y against the energizing force of the energizing portion 10 as described above.

Note that the configuration including the communication hole 152 and the valve 153 in the housing box 42 may be applied to the switch 51 according to the second embodiment.

The configuration illustrated in the aforementioned embodiment merely illustrates an example of the content of the preset invention, and can thus be combined with another known technique or partially omitted and/or modified without departing from the scope of the present invention.

REFERENCE SIGNS LIST 1 switch; 2 movable contact (first contact); 2a contact portion; 2b energizing portion; 3 intermediate contact (second contact); 3a one end; 3b another end; 3c side surface; 4 guide body; 5 main mover; 6 first intermediate arc electrode; 7 second intermediate arc electrode; 8 slide contact; 9 partition; 10 energizing portion; 11 insulating guide; 11a outer surface; 12, 13 arc; 15 regulating portion; 21 first abutting portion; 22 second abutting portion; 23 movable arc electrode (arc generator); 41 surrounding portion; 41a outer surface; 42 housing box; 42a opening; 42b protrusion; 43 box arc electrode; 44 housing space; 44a first space; 44b second space; 50 operating shaft; 51 switch; 52 movable contact (first contact); 52a protrusion; 52b side surface; 52c facing portion; 53 movable arc electrode (arc generator); 54 fixed contact (third contact); 54a contact portion; 54b energizing portion; 55 slide contact (first abutting portion); 56 second abutting portion; 57 third abutting portion; 151 switch; 152 communication hole; 153 valve.

The invention claimed is:
1. A switch comprising:
a first contact placed to be able to reciprocate in a first direction along an operating shaft and in a second direction opposite to the first direction;
a second contact placed on a side of the first direction with respect to the first contact to be able to reciprocate in the first direction and the second direction along the operating shaft;
a housing box to include inside a housing space housing one end of the second contact on the side of the first direction, to form an opening through which the second contact can pass, and to allow another end of the second contact opposite to the one end to be exposed to the outside of the housing space through the opening;
a surrounding portion erected in the second direction from the opening of the housing box and surrounding a side surface of the second contact;
a slide contact placed between the second contact and the surrounding portion and in contact with the second contact and the surrounding portion;
a partition to be formed integrally with a part of the second contact housed in the housing space and to partition the housing space into a first space on the side of the first direction and a second space on a side of the second direction; and an energizing portion to energize the second contact in the first direction, wherein the first contact, the second contact, the housing box, the surrounding portion, and the slide contact are each formed of a conductor, the partition is formed of an insulator, the first contact includes a first abutting portion to be able to come into contact with the side surface of the second contact, a second abutting portion formed on the side of the first direction with respect to the first abutting portion to be able to come into contact with an outer surface of the surrounding portion, and an arc generator placed on the side of the first direction with respect to the first abutting portion to generate an arc between the second contact and the arc generator, a facing portion that faces the one end of the second contact is formed on a part of an inner wall surface forming the first space of the housing space, and an insulating guide made of an insulator is placed in a part of the side surface of the second contact, the part coming into contact with the slide contact in a state in which the second contact is disposed on the side of the first direction by energizing force of the energizing portion.

2. The switch according to claim 1, wherein a gap is formed between the one end of the second contact and the facing portion in the state in which the second contact is disposed on the side of the first direction by the energizing force of the energizing portion.

3. The switch according to claim 1, wherein the one end of the second contact is in contact with the facing portion in the state in which the second contact is disposed on the side of the first direction by the energizing force of the energizing portion.

4. The switch according to claim 1, further comprising an ablation material placed in the first space.

5. The switch according to claim 1, wherein a communication hole that communicates the inside and the outside of the housing space is formed on a surface of the housing box in contact with the first space, and the switch further includes a valve to open and close the communication hole in accordance with a pressure inside the first space.

6. A switch comprising:

a first contact placed to be able to reciprocate in a first direction along an operating shaft and in a second direction opposite to the first direction;

a second contact placed on a side of the first direction with respect to the first contact to be able to reciprocate in the first direction and the second direction along the operating shaft;

a housing box to include inside a housing space housing one end of the second contact on the side of the first direction, to form an opening through which the second contact can pass, and to allow another end of the second contact opposite to the one end to be exposed to the outside of the housing space through the opening;

a surrounding portion erected in the second direction from the opening of the housing box and surrounding a side surface of the second contact;

a slide contact placed between the second contact and the surrounding portion and in contact with the second contact and the surrounding portion;

a third contact placed around the surrounding portion;

a partition to be formed integrally with a part of the second contact housed in the housing space and to partition the housing space into a first space on the side of the first direction and a second space on a side of the second direction; and an energizing portion to energize the second contact in the first direction, wherein the first contact, the second contact, the third contact, the housing box, the surrounding portion, and the slide contact are each formed of a conductor, the partition is formed of an insulator, the first contact includes a first abutting portion to be able to come into contact with the side surface of the second contact and an arc generator placed on the side of the first direction with respect to the first abutting portion to generate an arc between the second contact and the arc generator, the third contact includes a second abutting portion in contact with an outer surface of the surrounding portion, and a third abutting portion placed on the side of the second direction with respect to the second abutting portion to be able to come into contact with an outer surface of the first contact, a facing portion that faces the one end of the second contact is formed on a part of an inner wall surface forming the first space of the housing space, and an insulating guide made of an insulator is placed in a part of the side surface of the second contact, the part coming into contact with the slide contact in a state in which the second contact is disposed on the side of the first direction by energizing force of the energizing portion.

7. The switch according to claim 6, wherein a gap is formed between the one end of the second contact and the facing portion in the state in which the second contact is disposed on the side of the first direction by the energizing force of the energizing portion.

8. The switch according to claim 6, wherein the one end of the second contact is in contact with the facing portion in the state in which the second contact is disposed on the side of the first direction by the energizing force of the energizing portion.

9. The switch according to claim 6, further comprising an ablation material placed in the first space.

10. The switch according to claim 6, wherein a communication hole that communicates the inside and the outside of the housing space is formed on a surface of the housing box in contact with the first space, and the switch further includes a valve to open and close the communication hole in accordance with a pressure inside the first space.

* * * * *